US010652552B1

(12) United States Patent
Young et al.

(10) Patent No.: US 10,652,552 B1
(45) Date of Patent: May 12, 2020

(54) EFFICIENT NOISE REDUCTION CODING

(71) Applicant: GOOGLE LLC, Mountain View, CA (US)

(72) Inventors: Joseph Young, Mountain View, CA (US); Todd Nguyen, Saratoga, CA (US); Dake He, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/264,814

(22) Filed: Feb. 1, 2019

(51) Int. Cl.
H04N 19/159 (2014.01)
H04N 19/117 (2014.01)
H04N 19/86 (2014.01)
H04N 19/172 (2014.01)
H04N 19/80 (2014.01)

(52) U.S. Cl.
CPC ......... H04N 19/159 (2014.11); H04N 19/117 (2014.11); H04N 19/172 (2014.11); H04N 19/80 (2014.11); H04N 19/86 (2014.11)

(58) Field of Classification Search
CPC .... H04N 19/159; H04N 19/172; H04N 19/86; H04N 19/80; H04N 19/117
USPC ........................................ 375/240.01–240.29
See application file for complete search history.

(56) References Cited

U.S. PATENT DOCUMENTS

| 5,600,731 | A | 2/1997 | Sezan et al. | |
| 6,724,437 | B2 | 4/2004 | Funke et al. | |
| 7,245,783 | B2 | 7/2007 | Fielding | |
| 2006/0103765 | A1 | 5/2006 | Zhou et al. | |
| 2012/0170864 | A1* | 7/2012 | Raffalli | H04N 19/117 382/266 |
| 2015/0237375 | A1* | 8/2015 | Okamoto | H04N 19/176 375/240.2 |
| 2017/0318295 | A1* | 11/2017 | Pun | H04N 19/197 |

OTHER PUBLICATIONS

Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.

(Continued)

Primary Examiner — Jared Walker
(74) Attorney, Agent, or Firm — Young Basile Hanlon & MacFarlane, P.C.

(57) ABSTRACT

Efficient noise reduction coding may include generating, by a processor, an encoded frame by encoding an input video frame. Encoding the input frame includes determining an estimated noise level for the input video frame, determining a minimum quantization parameter level based on the estimated noise level for the input video frame, determining a quantization parameter value for encoding the input frame such that the quantization parameter value is at least the minimum quantization parameter level, obtaining the encoded frame by encoding the input frame in accordance with the quantization parameter level, including the encoded frame in an output bitstream, and outputting the output bitstream.

21 Claims, 8 Drawing Sheets

(56) References Cited

OTHER PUBLICATIONS

Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

\* cited by examiner

EFFICIENT NOISE REDUCTION CODING

BACKGROUND

Digital images and video can be used, for example, on the internet, for remote business meetings via video conferencing, high definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth, such as image and video coding using efficient noise reduction coding.

SUMMARY

This application relates to encoding and decoding of image data, video stream data, or both for transmission or storage. Disclosed herein are aspects of systems, methods, and apparatuses for encoding and decoding using efficient noise reduction coding.

An aspect is a method for video coding using efficient noise reduction coding. Video coding using efficient noise reduction coding includes generating, by a processor, an encoded frame by encoding an input video frame. Encoding the input frame includes determining an estimated noise level for the input video frame, determining a minimum quantization parameter level based on the estimated noise level for the input video frame, determining a quantization parameter value for encoding the input frame such that the quantization parameter value is at least, such as greater than or equal to, the minimum quantization parameter level, obtaining the encoded frame by encoding the input frame in accordance with the quantization parameter level, including the encoded frame in an output bitstream, and outputting the output bitstream.

Another aspect is an apparatus for encoding a video frame using efficient noise reduction coding. The apparatus includes a processor configured to generate an encoded frame by encoding an input video frame. The processor is configured to encode the input frame by determining an estimated noise level for the input video frame, determining a minimum quantization parameter level based on the estimated noise level for the input video frame, determining a quantization parameter value for encoding the input frame such that the quantization parameter value is at least, such as greater than or equal to, the minimum quantization parameter level, obtaining the encoded frame by encoding the input frame in accordance with the quantization parameter level, including the encoded frame in an output bitstream, and outputting the output bitstream.

Another aspect is a method for video coding using efficient noise reduction coding. Video coding using efficient noise reduction coding includes generating, by a processor, an encoded frame by encoding an input video frame, wherein encoding the input frame includes determining an estimated noise level for the input video frame. Determining the estimated noise level for the input video frame includes determining a plurality of estimated noise levels such that the plurality of estimated noise levels includes a respective estimated noise level for each portion from a plurality of partially overlapping portions from the input video frame, wherein each portion from a plurality of partially overlapping portions includes a respective plurality of pixels, and wherein, for each portion from a plurality of partially overlapping portions. Determining the respective estimated noise level includes determining convolved values for the portion, wherein each convolved value from the convolved values for the portion corresponds to a respective pixel from the respective plurality of pixels from the portion, and determining an averaged value by averaging the convolved values such that convolved values corresponding to pixels having pixel values outside a defined range are omitted from the determining the averaged value and convolved values corresponding to pixels having pixel values within the defined range are included in determining the averaged value. Determining the respective estimated noise level includes, in response to a determination that a cardinality of pixels from the portion having pixel values within the defined range is at least, such as greater than or equal to, a defined minimum threshold, determining an estimated noise level for the portion as a product of the averaged value, a defined constant multiplier, and a defined constant correction coefficient, and including the estimated noise level for the portion in the plurality of estimated noise levels. Determining the respective estimated noise level includes, in response to a determination that the cardinality of pixels from the portion having pixel values within the defined range is less than the defined minimum threshold, omitting an estimated noise level for the portion from the plurality of estimated noise levels. Determining the estimated noise level for the input video frame includes identifying the minimum estimated noise level from the plurality of estimated noise levels as the estimated noise level for the input video frame, obtaining the encoded frame by based on the minimum estimated noise level, including the encoded frame in an output bitstream, and outputting the output bitstream.

Another aspect is an apparatus for encoding a video frame using efficient noise reduction coding. The apparatus includes a processor configured to generate an encoded frame by determining an estimated noise level for the input video frame. Determining the estimated noise level for the input video frame includes determining a plurality of estimated noise levels such that the plurality of estimated noise levels includes a respective estimated noise level for each portion from a plurality of partially overlapping portions from the input video frame, wherein each portion from a plurality of partially overlapping portions includes a respective plurality of pixels, and wherein, for each portion from a plurality of partially overlapping portions. Determining the respective estimated noise level includes determining convolved values for the portion, wherein each convolved value from the convolved values for the portion corresponds to a respective pixel from the respective plurality of pixels from the portion, and determining an averaged value by averaging the convolved values such that convolved values corresponding to pixels having pixel values outside a defined range are omitted from the determining the averaged value and convolved values corresponding to pixels having pixel values within the defined range are included in determining the averaged value. Determining the respective estimated noise level includes, in response to a determination that a cardinality of pixels from the portion having pixel values within the defined range is at least, such as greater than or equal to, a defined minimum threshold, determining an estimated noise level for the portion as a product of the averaged value, a defined constant multiplier, and a defined constant correction coefficient, and including the estimated noise level for the portion in the plurality of estimated noise levels. Determining the respective estimated noise level includes, in response to a determination that the cardinality of pixels from the portion having pixel values within the defined range is less than the defined minimum threshold, omitting an estimated noise level for the portion from the plurality of estimated noise levels. Determining the estimated noise level for the input video frame includes identifying the minimum estimated noise level from the plurality of estimated noise levels as the estimated noise level for the input video frame, obtaining the encoded frame by based on the minimum estimated noise level, including the encoded frame in an output bitstream, and outputting the output bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views unless otherwise noted or otherwise clear from context.

DETAILED DESCRIPTION

Figure 1:
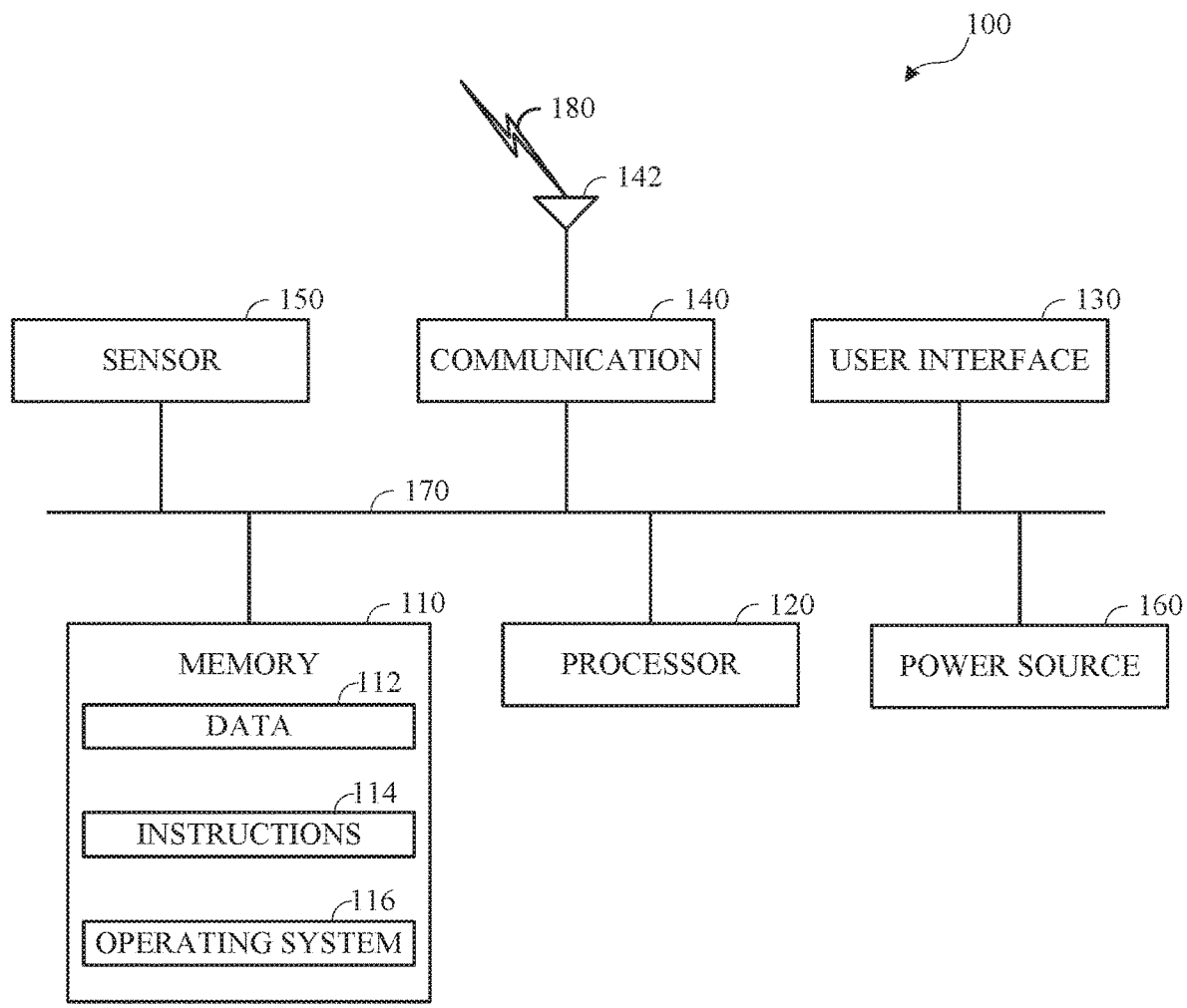
FIG. 1 is a diagram of a computing device in accordance with implementations of this disclosure.

Image and video compression schemes may include dividing an image, or frame, into smaller portions, such as blocks, and generating an output bitstream using techniques to limit the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients, quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to recreate the blocks and the source images from the limited information.

Input frames, such as images or video frames, may include input noise. Input noise may reduce coding efficiency, such as by utilizing bandwidth for encoding noise information and reducing the accuracy and efficiency of video coding. The input noise may include, for example, ambient thermal noise, noise caused defects of video acquisition pipeline, such as sensor defects, lens defects, image signal processing defects, or a combination thereof, or any other input noise.

Video coding using efficient noise reduction coding may improve the efficiency and accuracy of video coding by identifying an estimated noise level for an input video frame based on determining estimated noise levels for partially overlapping portions of the input video frame. The estimated noise level for a partially overlapping portions of the input video frame is determined by convolving the input pixel values and determining an average of the convolved values corresponding to input pixel values other than input pixel values near, such as within a defined distance from, the minimum or maximum pixel values. The estimated noise level for the input video frame may be identified based on the estimated noise levels for partially overlapping portions that have a cardinality of input pixel values, other than input pixel values near the minimum or maximum pixel values, that is at least a minimum threshold cardinality. The input frame may be noise filtered using a noise filter strength identified based on the estimated noise level for the input video frame. A quantization parameter for encoding the noise filtered frame may be identified based on a minimum quantization parameter level identified based on the estimated noise level for the input video frame. Video coding using efficient noise reduction coding may minimize resource utilization, such as memory utilization, and may be performed using parallel processing. For example, video coding using efficient noise reduction coding may improve noise reduction relative to noise reduction coding that overestimates noise at low noise levels and in highly textured images or image areas. In another example, video coding using efficient noise reduction coding may reduce resource utilization relative to noise reduction coding that includes sorting. In another example, video coding using efficient noise reduction coding may reduce resource utilization relative to noise reduction coding that includes determining local variance and determining a weighted average.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can capture an image such as the image of a user operating the computing device. Although a single sensor 150 is shown, the computing device 100 may include a number of sensors 150. For example, the computing device 100 may include a first camera oriented in a first direction, such as with a field of view directed toward a user of the computing device 100, and a second camera oriented in another direction, such as with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170. Although a single bus 170 is shown in FIG. 1, a computing device 100 may include multiple buses.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
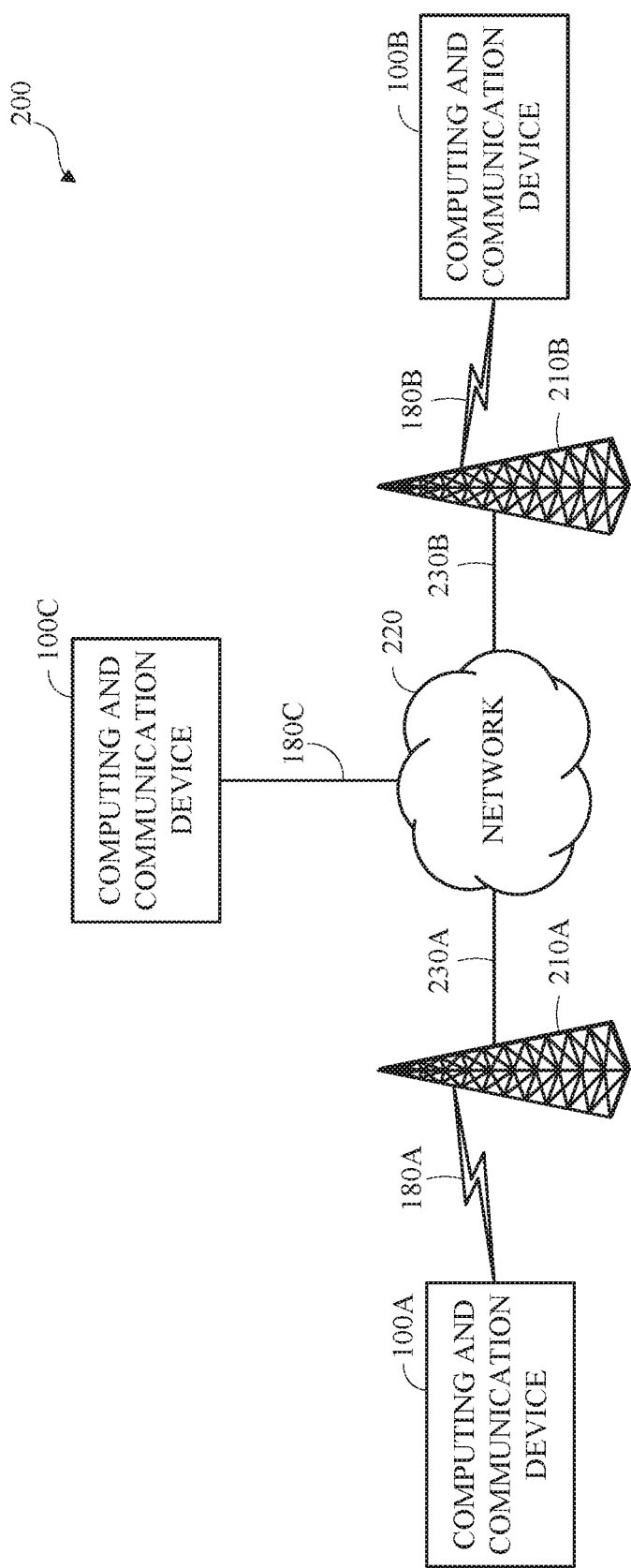
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
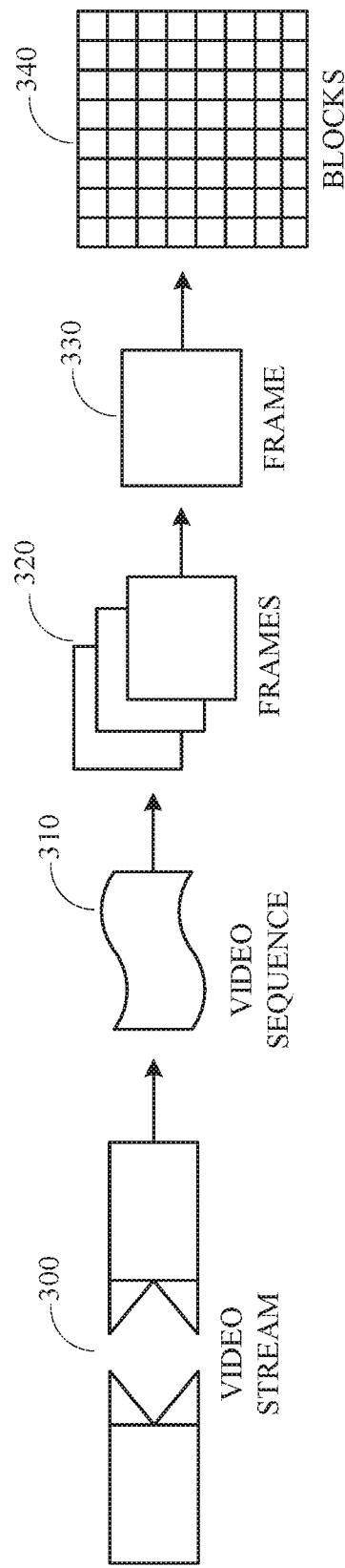
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
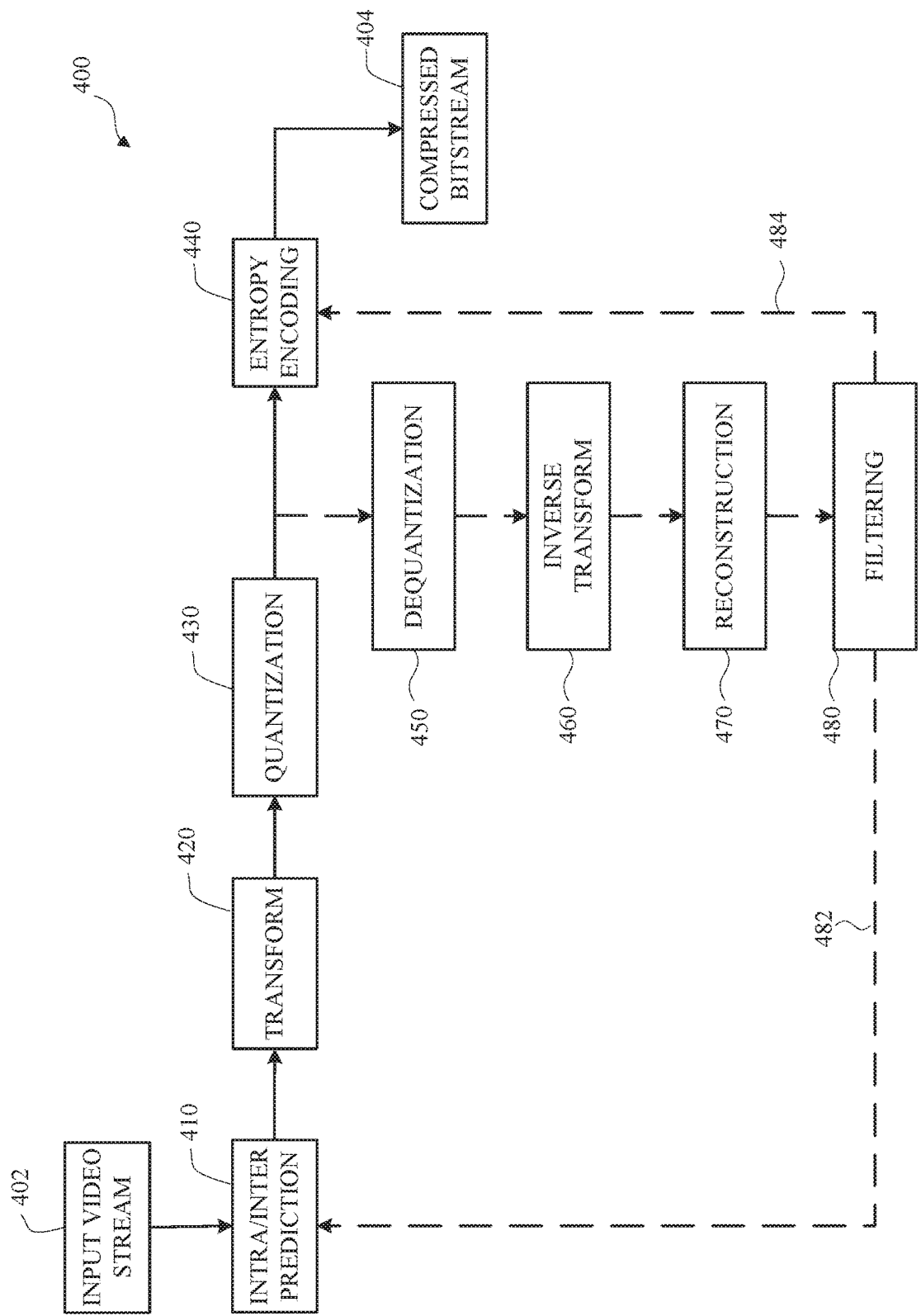
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
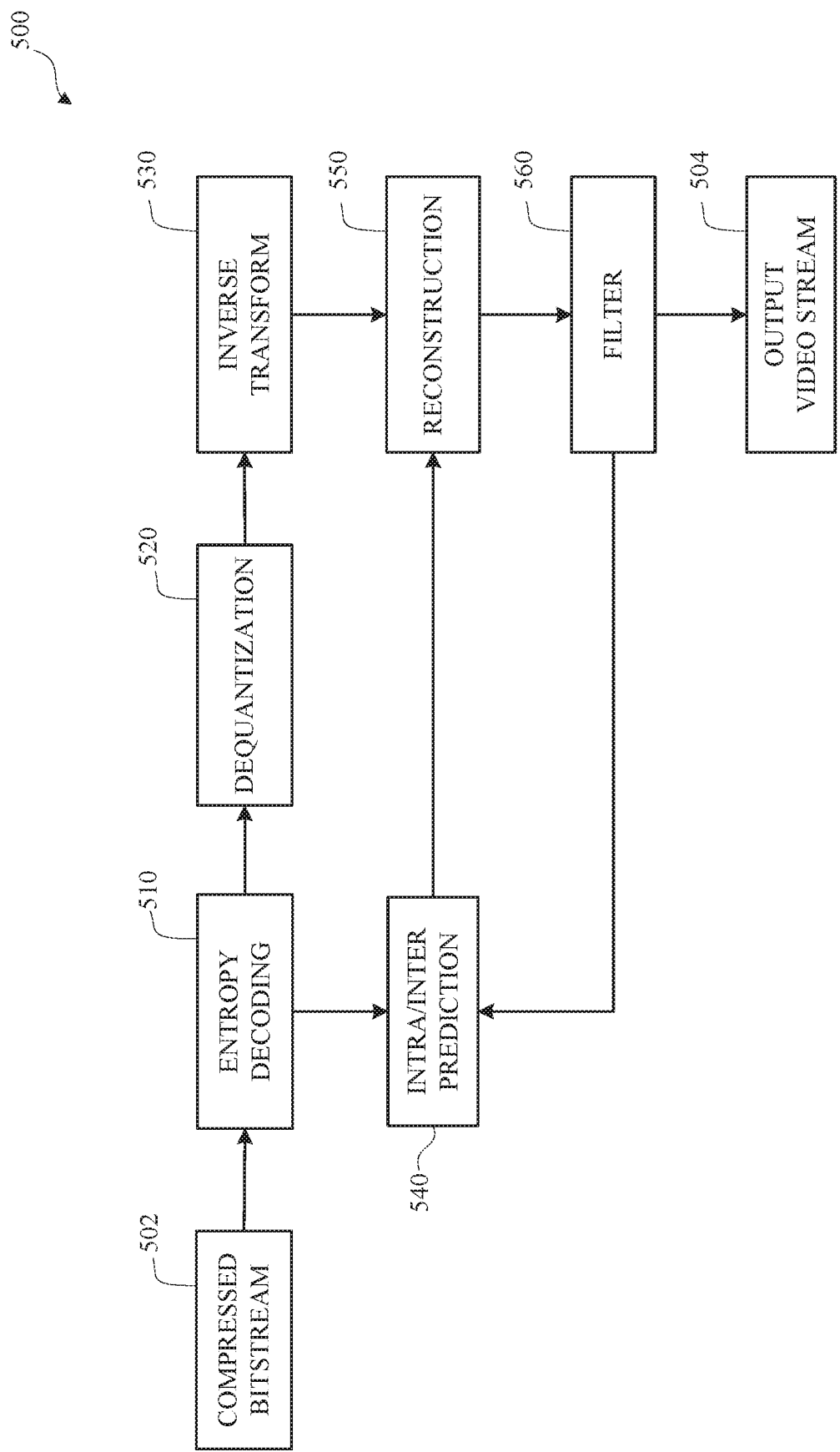
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
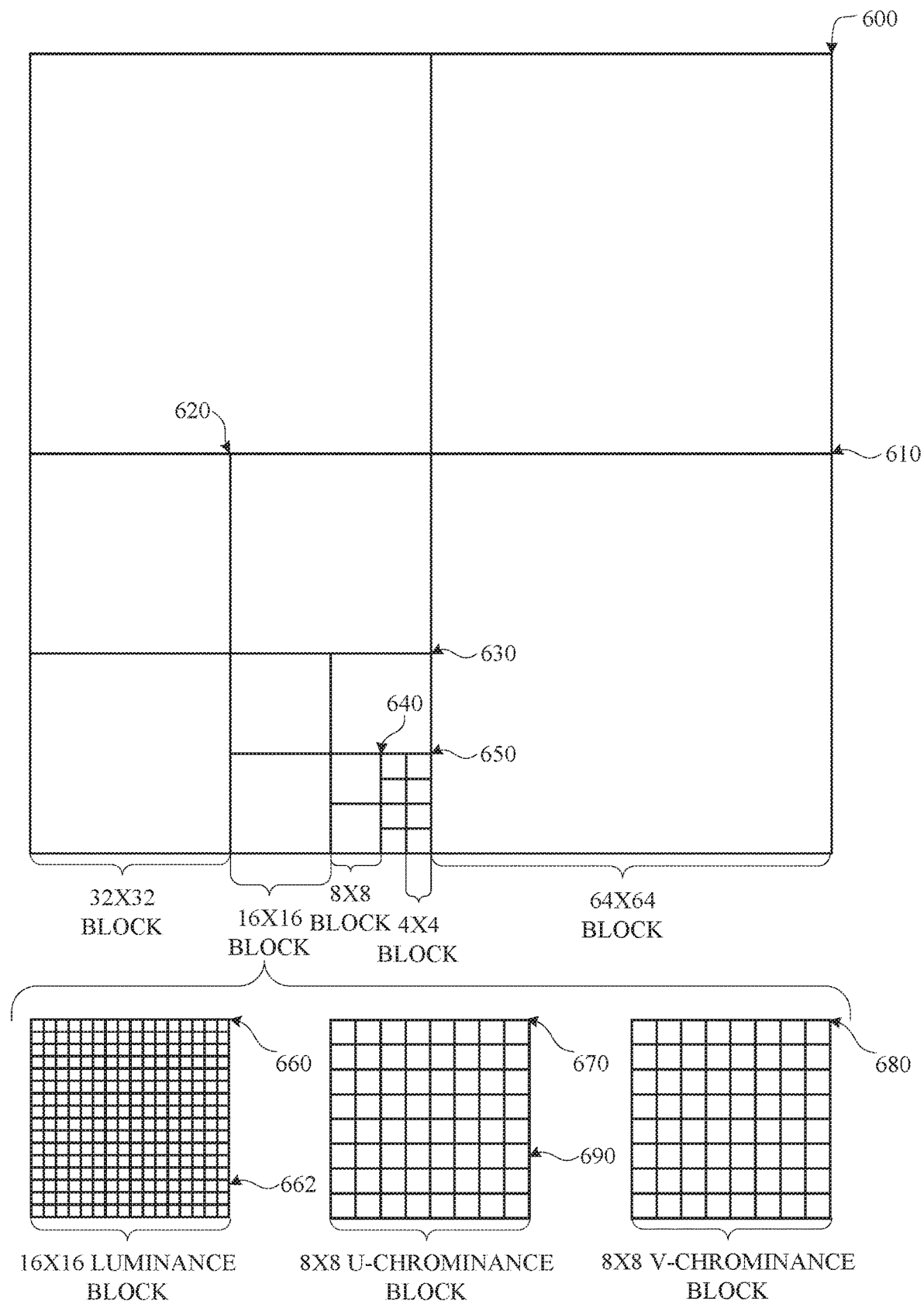
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
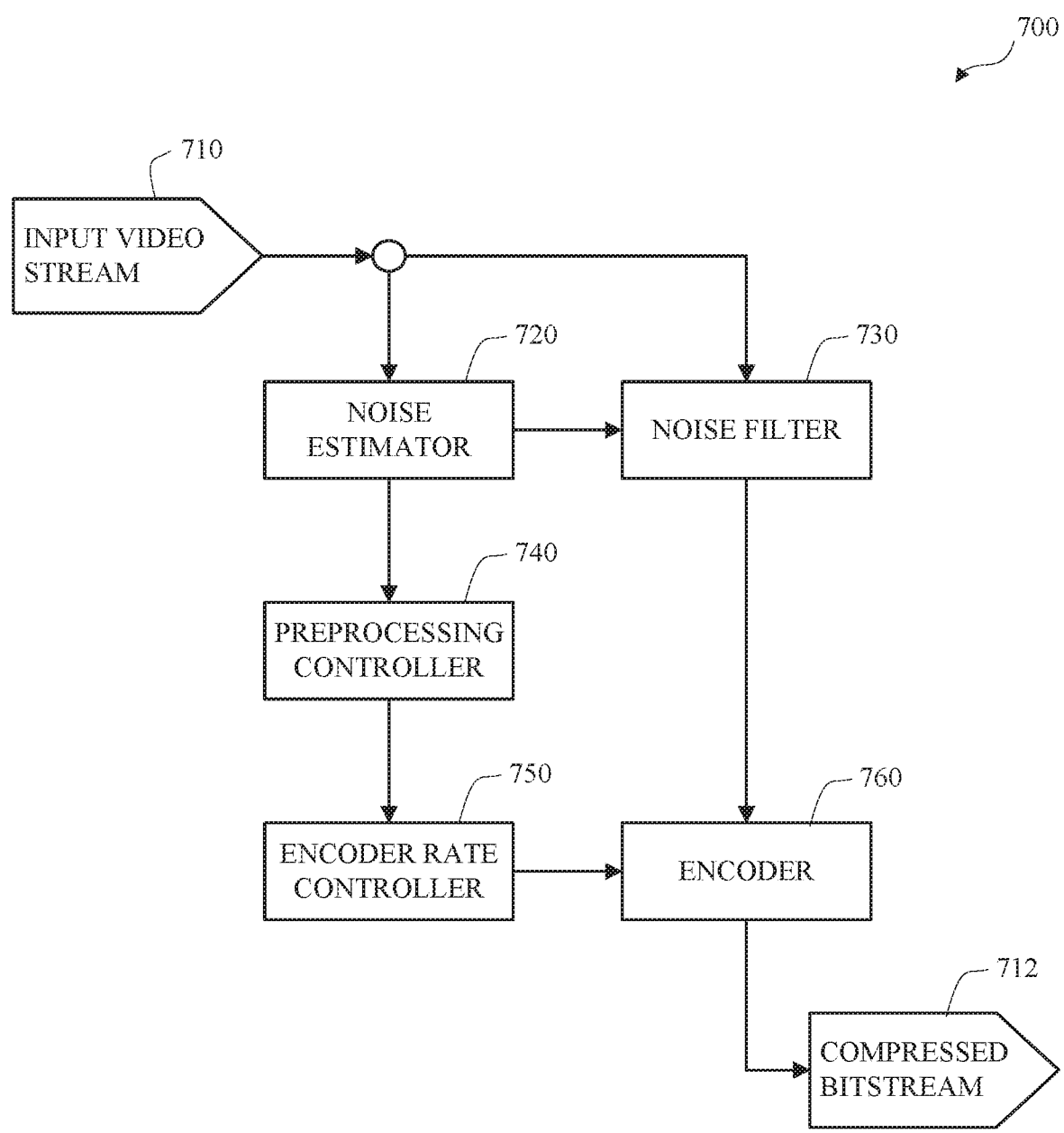
FIG. 7 is a block diagram of a noise reducing encoding unit in accordance with implementations of this disclosure.

FIG. 7 is a block diagram of a noise reducing encoding unit 700 in accordance with implementations of this disclosure. The noise reducing encoding unit 700 can be implemented in a device, such as the computing device 100 shown in FIG. 1 or the computing and communication devices 100A, 100B, 100C shown in FIG. 2. In some implementations, the noise reducing encoding unit 700 may be implemented as a computer software program stored in a data storage unit, such as the memory 110 shown in FIG. 1. The computer software program can include machine instructions that may be executed by a processor, such as the processor 120 shown in FIG. 1, and may cause the device to encode video data as described herein. In some implementations, the noise reducing encoding unit 700 may be implemented as specialized hardware, such as circuitry, included, for example, in computing device 100. In some implementations, the noise reducing encoding unit 700 may be implemented as a combination of specialized hardware and software executed by a processor.

In some implementations, imaged noise may be modeled as additive, zero mean noise, where f indicates a noiseless image, n indicates noise, and I indicates a noisy image, which may be expressed as the following:

$$I(x,y)=f(x,y)+n(x,y). \quad \text{[Equation 1]}$$

Estimating noise may include determining a standard deviation ($\sigma_n$) of the noise (n). Some image elements, such as edges, may have strong second order differential components. Estimating the noise may include using a difference between two masks $L_1$ and $L_2$, which may respectively approximate a Laplacian of the image. The first mask $L_1$ may be expressed as the following:

$$L_1 = \begin{bmatrix} 0 & 1 & 0 \\ 1 & -4 & 1 \\ 0 & 1 & 0 \end{bmatrix}$$

The second mask $L_2$ may be expressed as the following:

$$L_2 = \frac{1}{2}\begin{bmatrix} 1 & 0 & 1 \\ 0 & -4 & 0 \\ 1 & 0 & 1 \end{bmatrix}$$

A noise estimation operator N may implement a mask operation using a mask that may be expressed as follows:

$$N = 2(L_2 - L_1) = \begin{array}{|c|c|c|} \hline 1 & -2 & 1 \\ \hline -2 & 4 & -2 \\ \hline 1 & -2 & 1 \\ \hline \end{array}$$ [Equation 2]

The noise at each pixel may have a standard deviation ($\sigma_n$) and the noise estimation operator N may have a zero mean and variance, which may be expressed as the following:

$$(4^2 + 4 \cdot (-2)^2 + 4 \cdot 1^2)\sigma_n^2 = 36\sigma_n^2.$$ [Equation 3]

The value of applying the noise estimation operator N at a position (x, y) in the image may be expressed as the following:

$$I(x,y) * N.$$ [Equation 4]

An estimate of $36\sigma_n^2$ at each pixel may be determined as the variance of the output of the noise estimation operator N, which may be averaged over the image, or a portion thereof, to determine an estimate of the noise variance $\sigma_n^2$. Determining the variance of the noise for the image (I), having a width in pixels (W) and a height in pixels (H), may be expressed as the following:

$$\sigma_n^2 = \frac{1}{36(W-2)(H-2)} \sum_I (I(x, y) * N)^2.$$ [Equation 5]

The variance may be determined using absolute deviation, with Gaussian distribution with zero mean and variance $\sigma^2$, which may be expressed as the following:

$$\sigma_n = \sqrt{\frac{\pi}{2}} \frac{1}{6(W-2)(H-2)} \sum_I |I(x, y) * N|.$$ [Equation 6]

Noise estimation as expressed in Equations 1-6 may include overestimation, such as for images, or image portions, wherein noise is low, texture is high, or a combination thereof.

The noise reducing encoding unit 700 shown in FIG. 7 may implement efficient noise reduction coding. The noise reducing encoding unit 700 receives an input video stream 710 as input and generates a compressed bitstream 712 as output. The noise reducing encoding unit 700 includes a noise estimator 720, a noise filter 730, a preprocessing controller 740, an encoder rate controller 750, and an encoder 760.

The noise estimator 720 receives the input video stream 710, or a portion thereof. For example, the noise estimator 720 may receive an input video frame or a sequence of input video frames. The input video frame may be an uncompressed frame. The input video frame may include one or more planes or channels. For example, the input video frame may represent an image using three channels, such as a luma (Y) channel and two chroma (Cb/Cr) channels. The channels can may have an input size. For example, the chroma channels can be subsampled by half in each dimension.

The noise estimator 720 determines an estimated noise level for the input video frame, which may be an estimate of input noise. Determining the estimated noise level may include a block-based determination based, which may be based on overlapping areas from the input video frame, which may improve the accuracy of the estimation and reduce resource, such as hardware, utilization.

The estimated noise level may be a value that represents the detected noise level in the input frame. In some implementations, the estimated noise level may represent the detected noise level in the luma plane of the input frame. In some implementations, the estimated noise level may be represented as a two-dimensional spatial array of values, which may be separate or combined values for the luma and chroma planes.

Determining the estimated noise level for the input video frame may include identifying a portion of the input video frame. For example, the noise estimator 720 may identify a spatially contiguous group of pixels, such as a 16×16 block of pixels. Other size blocks of pixels may be used.

Determining the estimated noise level for the input video frame may include determining convolved values for the portion of the input video frame. Determining the convolved values may include determining a convolution of the input pixel values of the portion, which may include using a convolution matrix or kernel, such as a Laplacian kernel, which may generate a respective convolved value corresponding to each respective pixel from the portion of the input frame.

Determining the estimated noise level for the input video frame may include determining an averaged value by averaging the convolved values such that convolved values corresponding to pixels having pixel values outside a defined range are omitted from the averaging and convolved values corresponding to pixels having pixel values within the defined range are included in the averaging. For example, convolved values corresponding to pixels having pixel values that are less than a defined minimum threshold may be omitted from the average, convolved values corresponding to pixels having pixel values that are greater than a defined maximum threshold may be omitted from the average, and convolved values corresponding to pixels having pixel values that are at least, such as greater than or equal to, the defined minimum threshold and are within, such as less than or equal to the defined maximum threshold may be included in the average. In some implementations, the defined minimum threshold may be determined as a minimum percentage, such as 10 percent, of a defined range, such as [0-255]. In some implementations, the defined maximum threshold may be determined as a defined maximum percentage, such as 90 percent, of the defined range. Other ranges and percentages may be used. In some implementations, the range of pixel values, and the subset of the range included in the average may correspond with bit-depth. For example, eight-bit video may express pixel values in the range from 0-255 and the subset of the range used for the averaging may be 26-229. Ten-bit video may express pixel values in the range from 0-1023 and the subset of the range used for the averaging may be 101-922. Twelve-bit video may express pixel values in the range from 0-4095 and the subset of the range used for the averaging may be 401-3694. In some implementations, the subset of the range for averaging may be determined based on a defined cardinality of values (T), such as 25 (T=25) or 31 (T=31), such that values from 0 to T and from (1<<Bitdepth)−1−T to (1<<Bitdepth)−1. For example, ten-bit video may express pixel values in the range from 0-1023 and the subset of the range used for the averaging based on T=25 may be 25-997. Omitting values close to the minimum (below 10%) or close to the maximum (above 90%) may reduce or eliminate bias and may reduce or eliminate overestimation, such as for images, or image portions, wherein noise is low, texture is high, or a combination thereof.

Determining the estimated noise level for the input video frame may include determining a product of multiplying the averaged value by a defined constant multiplier. For example, the defined constant multiplier may be $(\frac{1}{6})\sqrt{(\pi/2)}$. A defined constant correction coefficient, such as 1.4, may be multiplied by the product of multiplying the averaged value by the defined constant multiplier. The defined constant correction coefficient may be determined by regression, such as based on training data, such as to maximize coding performance.

Determining the estimated noise level for the input video frame may include determining a respective estimated noise level for each of multiple portions of the input video frame, which may be partially overlapping, such as less than fully overlapping, portions. For example, each portion of the input video frame may be a 16×16 block of pixels which may overlap with one more adjacent portions, such as by a defined cardinality or number of pixels, such as by eight pixels horizontally, by eight pixels vertically, or by eight pixels horizontally and eight pixels vertically. In some implementations, the portions of the input video frame may be identified in accordance with a scan order, such as raster order.

Determining the estimated noise level for the input video frame may include determining the estimated noise level as a function, such as a minimum, a sum, or an average, of the estimated noise level for each portion (e.g., partially overlapping portion) of the input video frame. In some embodiments, determining the estimated noise level for the input video frame may include determining a two-dimensional spatial array including the estimated noise level for each respective portion (e.g., partially overlapping portion) of the input video frame. In some implementations, determining the estimated noise level for the input video frame may include determining the estimated noise level for the input video frame by determining the minimum estimated noise level among the estimated noise levels for portions of the input video frame having a cardinality of pixels (the pixels having values within the defined subset of the range) of at least a defined threshold, such as eleven pixels, and omitting the estimated noise levels for portions of the input video frame having a cardinality of pixels having values within the defined range below, such as less than, the defined threshold. For example, pixels in a portion of an image corresponding to a letterboxing black border may have values near the maximum (above 90%), the cardinality of pixels for the portion within the defined range may be below the defined threshold, and the portion of the image corresponding to the letterboxing black border may be omitted from the noise determination.

The noise estimator 720 may determine a noise filter strength for denoising the input frame. The noise estimator 720 may output the determined noise filter strength to the noise filter 730. The determined noise filter strength may indicate an optimized target level of noise reduction for denoising the frame. In some implementations, the noise filter strength may be represented as a two-dimensional spatial array of values.

The noise filter 730 may remove, or partially remove, noise details from the input video frame, which may include generating an input noise filtered frame by noise filtering the input video frame in accordance with the noise filter strength determined by the noise estimator 720. The noise filter strength determines how much noise detail to remove from the frame. For example, the noise filter may perform low-pass filtering based on a cut-off frequency identified based on the noise filter strength, which may include determining filter weights, filter length, or a combination thereof, for use in low-pass filtering. In another example, the noise filter may perform guided, or self-guided, filtering, which may include determining a template size based on the noise filter strength. In another example, relative weighting between input pixel values and estimated denoised values may be identified based on the noise filter strength. The noise filter 7340 may include spatial noise filtering, temporal noise filtering, or a combination of spatial and temporal noise filtering. In some implementations, the noise filter 730 may be a self-guided filter.

The preprocessing controller 740 reads the estimated noise level for each frame and determines a minimum quantization parameter level (MinQP) for the encoder rate controller 750. The minimum quantization parameter level may be determined as a function of the estimated noise levels.

For example, the input noise filtered frame output by the noise filter 730 may be evaluated with respect to the noisy input video frame to identify a quantization parameter inflection point. A decrease in the quantization parameter below the inflection point corresponds with an increase in coding quality that is below a defined minimum threshold. An increase in the quantization parameter above the inflection point corresponds with a decrease in coding quality. For example, identifying the inflection point may include denoising a video, or a portion thereof, testing a reconstructed frame corresponding to an encoded noisy frame against the denoised frame, such as by measuring distortion, stepping the quantization parameter from high to low, and determining the point that the second derivative of the Peak Signal to Noise Ratio (PSNR), Structural Similarity Index (SSIM), or both, becomes positive.

In some implementations, the preprocessing controller 740 may determine the noise filter strength and may output the determined noise filter strength to the noise filter 730. The noise filter strength may be determined as a function of the estimated noise level for the input video frame. In some implementations, the noise filter strength may be determined as a function of an estimated noise level determined for a previous input video frame. In some implementations, the noise filter strength may be determined as a function of a spatial filtered, temporally filtered, or spatially and temporally filtered value based on nearby frames, such as past frames, future frames, or a combination thereof. For example, in some implementations, the noise filter strength may be determined based on the current frame, which may include buffering or storing the current frame in memory, determining the noise filter strength for the current frame, and encoding the frame based on the determined noise filter strength. In some implementations, the noise filter strength for the current frame, or a portion thereof, such as the current portion, may be determined based on a previously processed frame, such as the previously encoded frame or a previously encoded reference frame. In some implementations, the noise filter strength for the current frame, or a portion thereof, such as the current portion, may be determined based on an average, or other cumulative metric, of multiple frames, such as multiple previously coded frames, which may reduce inter-frame variance in the noise filter strength and reduce corresponding artifacts.

The encoder rate controller 750 may determine a quantization parameter value for encoding the noise filtered input frame based on the minimum quantization parameter. The quantization parameter (QP) value may indicate the step-size used in quantization. For example, a lower quantization parameter value may generate a higher bitrate and may have relatively high accuracy (detail preservation). The minimum quantization parameter level may be provided to the encoder rate controller 750 to indicate that encoding using a quantization parameter value lower than the minimum quantization parameter level may increase the noise encoded in the output.

The encoder 760 may encode the noise filtered input frame based on the quantization parameter value identified by the encoder rate controller 750 to generate an encoded frame and may output the encoded frame, such as by including the encoded frame in the compressed bitstream 712.

Other variations of the noise reducing encoding unit 700 can be used to encode the input video stream 710. For example, the noise estimator 720 and the preprocessing controller 740 may be combined into a single unit.

Figure 8:
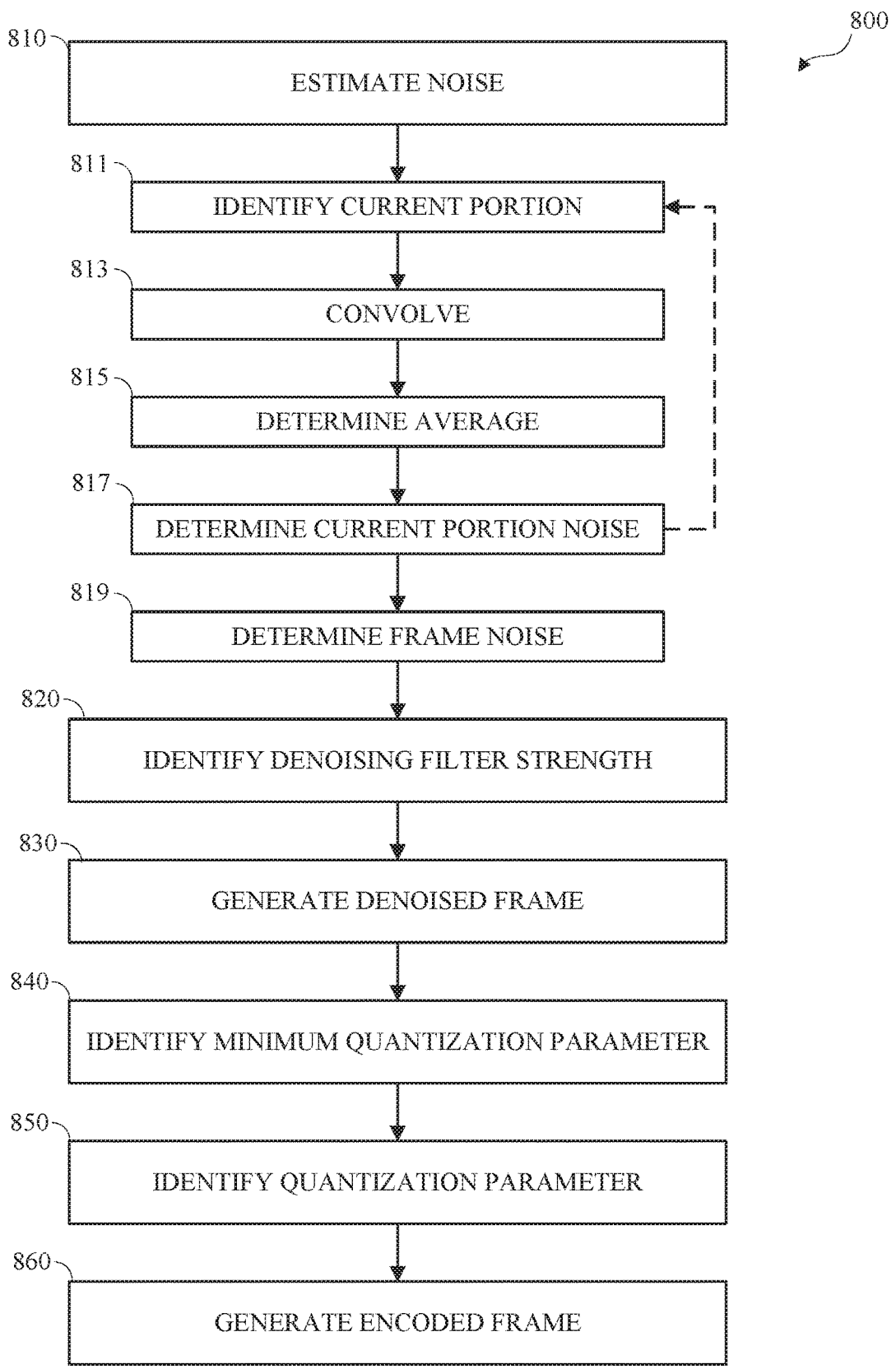
FIG. 8 is a flowchart diagram of an example of efficient noise reduction coding in accordance with implementations of this disclosure.

FIG. 8 is a flowchart diagram of an example of efficient noise reduction coding 800 in accordance with implementations of this disclosure. Efficient noise reduction coding 800 may be implemented in a noise reducing encoding unit, such as the noise reducing encoding unit 700 shown in FIG. 7.

Efficient noise reduction coding 800 may include estimating noise at 810, identifying a filter strength at 820, generating a denoised input frame at 830, identifying a minimum quantization parameter at 840, identifying a quantization parameter at 850, and generating an encoded frame at 860. Efficient noise reduction coding 800 may reduce memory resource utilization relative to denoising using sorting or ordering of block noise levels. Efficient noise reduction coding 800 may include determining a respective estimated noise level for two or more portions, such as two or more 16×16 blocks, in parallel.

Although not shown separately in FIG. 8, efficient noise reduction coding 800 may include obtaining an input frame, which may be an uncompressed input, or source, video frame. For example, the noise reducing encoding unit may receive, or otherwise access, an input image or input video stream or signal, or a portion thereof, such as the input video stream 710 shown in FIG. 7, and may identify the input image or a portion of the input video stream as the current input frame. Identifying the current input frame may include determining that the current input frame is a frame from a sequence of input frames, identifying a coding order for coding the sequence of input frames, determining a current coding order, and identifying the current input frame according to the current coding order. Identifying an input frame may include receiving one or more input frames at a frame buffer and buffering the input frames.

Noise estimation may be performed for the input frame at 810. The noise estimation may include identifying a current portion of the input frame at 811, generating convolved values at 813, determining an average value for the current portion 815, determining an estimated noise level for the current portion at 817, and determining an estimated noise level for the input frame at 819.

A current portion of the input frame may be identified at 811. For example, a noise estimation unit, such as the noise estimator 720 shown in FIG. 7, may identify the current portion of the input frame. The current portion of the input frame may be a spatially contiguous group of pixels (input pixels), such as a 16×16 block of pixels. Other size blocks of pixels may be used. The current portion may be identified according to a block-based scan order, such as raster scan order. Although efficient noise reduction coding 800 is described with reference to forward raster scan order, any scan order may be used. In some implementations, noise estimation at 810 may be performed based on a component of the input pixels, such as a luminance, or luma, component.

Convolved values for the current portion may be generated at 813. For example, the noise estimation unit may determine the convolved values. Determining the convolved values may include determining a convolution of the input pixel values of the portion, such as using a Laplacian kernel, which may generate a respective convolved value corresponding to each respective pixel from the portion of the input frame.

An average value for the current portion may be determined at 815. For example, the noise estimation unit may determine the average value for the current portion. The average value for the current portion may be determined based on the input pixel values for the current portion, the convolved values generated for the current portion at 813, or both.

Determining the average value may include determining a defined input pixel value range. The defined input pixel value range may be based on the bitdepth of the input frame. For example, an input frame having an eight-bit bitdepth may have pixel values in the range from zero to 255 ([0-255]). In another example, ten-bit video may express pixel values in the range from zero to 1023 ([0-1023]). In another example, twelve-bit video may express pixel values in the range from zero to 4095 ([0-4095]).

Determining the average value may include identifying input pixels having values near the low end of the defined input pixel value range. For example, the identifying input pixels having values near the low end of the defined input pixel value range may be pixels having values below a defined threshold value. In an example, the defined threshold (T) may be a defined, or fixed, value, such as such as 25 (T=25) or 31 (T=31). In another example, the defined threshold may be defined as a percentage, such as 10%, of the defined input pixel value range. Determining the average value may include omitting or excluding convolved values corresponding to input pixels having input pixel values near the low end of the defined input pixel value range from determining the average value.

Determining the average value may include identifying input pixels having values near the high end of the defined input pixel value range. For example, the identifying input pixels having values near the high end of the defined input pixel value range may be pixels having values above a defined threshold value. In an example, the defined threshold (T) may be a defined, or fixed, value, such as such as 25 (T=25) or 31 (T=31). In another example, the defined threshold may be defined as a percentage, such as 10%, of the defined input pixel value range. Determining the average value may include omitting or excluding convolved values corresponding to input pixels having input pixel values near the high end of the defined input pixel value range from determining the average value.

Determining the average value may include identifying input pixels having input pixel values other than values near the low end of the defined input pixel value range and values near the high end of the defined input pixel value range. The average value for the current portion may be determined as an average of the convolved values corresponding to the input pixels identified as having input pixel values other than input pixel values near the low end of the defined input pixel value range or input pixel values near the high end of the defined input pixel value range.

Determining the average value may include identifying a cardinality, or count, of input pixel values in the current portion having input pixel values other than input pixel values near the low end of the defined input pixel value range or input pixel values near the high end of the defined input pixel value range.

An estimated noise level for the current portion may be determined at 817. Determining the estimated noise level for the current portion may include determining the estimated noise level for the current portion based on the averaged value determined for the current portion at 815, a defined constant multiplier, and a defined constant correction coefficient. For example, determining the estimated noise level for the current portion may include determining the estimated noise level (n) for the current portion as a product of multiplying the averaged value (A), the defined constant multiplier (M), and the defined constant correction coefficient (C), which may be expressed as the following:

$$n = AMC. \quad\quad\quad [\text{Equation 7}]$$

In an example, the defined constant multiplier may be $(\frac{1}{6})\sqrt{(\pi/2)}$, and the defined constant correction coefficient may be 1.4. The defined constant correction coefficient may be determined by regression. In some implementations, the cardinality of input pixel values in the current portion having input pixel values other than input pixel values near the low end of the defined input pixel value range or input pixel values near the high end of the defined input pixel value range may be below a defined minimum threshold, such as eleven, and determining the estimated noise level for the current portion may be omitted for the current block.

A respective estimated noise level may be determined for each of multiple portions of the input frame as indicated by the broken line between determining the frame noise at 819 and identifying the current portion at 811. Each portion of the input frame may partially overlap one or more other portions of the input frame, such as by eight pixels horizontally, by eight pixels vertically, or by eight pixels horizontally and eight pixels vertically. For each partially overlapping portion of the input frame identifying the respective current portion of the input frame at 811, generating convolved values at 813, determining an average value for the current portion 815, and determining an estimated noise level for the current portion at 817 may be performed.

An estimated noise level for the input frame may be determined at 819. Determining the estimated noise level for the input frame may include identifying a minimum estimated noise level among the estimated noise levels identified for the respective partially overlapping portions. Partially overlapping portions having cardinality of input pixels having input pixel values other than input pixel values near the low end of the defined input pixel value range or input pixel values near the high end of the defined input pixel value range below the defined minimum threshold may be omitted from determining the estimated noise level for the input frame. Determining the estimated noise level for the input frame may be performed subsequent to determining the estimated noise level, or determining that the cardinality of input pixels having input pixel values other than input pixel values near the low end of the defined input pixel value range or input pixel values near the high end of the defined input pixel value range is below the defined minimum threshold, for each partially overlapping portion of the input frame.

A denoising filter strength may be identified at 820. For example, the noise estimator, a preprocessing controller, such as the preprocessing controller 740 shown in FIG. 7, or a combination thereof, may determine the denoising filter strength. The denoising filter strength may be determined as a function of the estimated noise level for the input video frame determined at 810. In some implementations, the denoising filter strength may be determined as a function of an estimated noise level determined for a previous input video frame. In some implementations, the denoising filter strength may be determined as a function of a spatial filtered, temporally filtered, or spatially and temporally filtered value based on nearby frames, such as past frames, future frames, or a combination thereof.

A denoised input frame, or noise filtered input frame, may be generated at 830. For example, a denoising unit, such as the noise filter 730 shown in FIG. 7, may generate the denoised input frame by denoising the input frame in accordance with the denoising filter strength identified at 820.

A minimum quantization parameter for the input frame may be determined at 840. The minimum quantization parameter for the input frame may be determined as a function of the estimated noise level for the input frame identified at 810. For example, a preprocessing controller, such as the preprocessing controller 740 shown in FIG. 7, may determine the minimum quantization parameter.

A quantization parameter for encoding the denoised input frame may be determined at 850. The quantization parameter (QP) may indicate the step-size used in quantization. For example, an encoder rate controller, such as the encoder rate controller 750 shown in FIG. 7, may determine a quantization parameter for encoding the noise filtered input frame based on the minimum quantization parameter identified at 840.

An encoded frame may be generated at 860. The encoded frame may be generated by encoding the denoised input frame generated at 830 in accordance with the quantization parameter identified at 850. For example, an encoder, such as the encoder 760 shown in FIG. 7, may generated the encoded frame. Although not shown separately in FIG. 8, the encoded frame may be output, such as by including the encoded frame, or a portion thereof, in an output bitstream, such as the compressed bitstream 712 shown in FIG. 7.

Other implementations of efficient noise reduction coding 800 are available. In some implementations, additional elements of efficient noise reduction coding can be added, certain elements can be combined, and/or certain elements can be removed.

As used herein, the terms "optimal", "optimized", "optimization", or other forms thereof, are relative to a respective context and are not indicative of absolute theoretic optimization unless expressly specified herein.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
    generating, by a processor, an encoded frame by encoding an input video frame, wherein encoding the input video frame includes:
        determining an estimated noise level for the input video frame;
        determining a minimum quantization parameter level based on the estimated noise level for the input video frame;
        determining a quantization parameter value for encoding the input frame such that the quantization parameter value is at least the minimum quantization parameter level;
        obtaining the encoded frame by encoding the input frame in accordance with the quantization parameter value;
    including the encoded frame in an output bitstream; and
    outputting the output bitstream.

2. The method of claim 1, wherein determining the estimated noise level for the input video frame includes:
    identifying a first portion of the input video frame, the first portion including a first plurality of pixels;
    determining convolved values for the first portion, wherein each convolved value from the convolved values for the first portion corresponds to a respective pixel from the first plurality of pixels;
    determining an averaged value by averaging the convolved values such that convolved values corresponding to pixels having pixel values outside a defined range are omitted from the averaging and convolved values corresponding to pixels having pixel values within the defined range are included in the averaging;
    determining an estimated noise level for the first portion as a product of the averaged value, a defined constant multiplier, and a defined constant correction coefficient; and
    obtaining the estimated noise level for the input video frame based on the estimated noise level for the first portion.

3. The method of claim 2, wherein determining the estimated noise level for the input video frame includes:
    identifying a second portion of the input video frame, the second portion partially overlapping the first portion;

determining an estimated noise level for the second portion; and obtaining the estimated noise level for the input video frame based on the estimated noise level for the first portion and the estimated noise level for the second portion.

4. The method of claim 3, wherein:
the first portion of the input frame is a 16×16 block of luminance pixels; and
the second portion of the input frame is a 16×16 block of luminance pixels.

5. The method of claim 4, wherein the second portion of the input frame overlaps the first portion of the input frame by eight pixels horizontally.

6. The method of claim 4, wherein the second portion of the input frame overlaps the first portion of the input frame by eight pixels vertically.

7. The method of claim 4, wherein the second portion of the input frame overlaps the first portion of the input frame by eight pixels horizontally and by eight pixels vertically.

8. The method of claim 2, wherein determining the estimated noise level for the input video frame includes:
determining a plurality of estimated noise levels such that the plurality of estimated noise levels includes a respective estimated noise level for each portion from a plurality of partially overlapping portions from the input video frame that includes the first portion of the input video frame;
identifying an updated plurality of estimated noise levels by, for each estimated noise level from the plurality of estimated noise levels:
in response to a determination that a cardinality of pixels having pixel values within the defined range from the respective portion from the plurality of partially overlapping portions is less than a defined minimum threshold, omitting the estimated noise level from the updated plurality of estimated noise levels; and
in response to a determination that the cardinality of pixels having pixel values within the defined range from the respective portion from the plurality of partially overlapping portions is at least the defined minimum threshold, including the estimated noise level in the updated plurality of estimated noise levels; and
identifying the minimum estimated noise level from the updated plurality of estimated noise levels as the estimated noise level for the input video frame.

9. The method of claim 1, wherein encoding the input frame includes:
determining a noise filter strength based on the estimated noise level for the input video frame;
generating an input noise filtered frame by noise filtering the input video frame in accordance with the noise filter strength;
wherein determining the quantization parameter value for encoding the input frame includes using the input noise filtered frame as the input frame; and
wherein encoding the input frame includes using the input noise filtered frame as the input frame.

10. An apparatus comprising:
a processor configured to generate an encoded frame by encoding an input video frame, wherein encoding the input frame includes:
determining an estimated noise level for the input video frame;
determining a minimum quantization parameter level based on the estimated noise level for the input video frame;
determining a quantization parameter value for encoding the input frame such that the quantization parameter value is at least the minimum quantization parameter level;
obtaining the encoded frame by encoding the input frame in accordance with the quantization parameter value;
including the encoded frame in an output bitstream; and
outputting the output bitstream.

11. The apparatus of claim 10, wherein determining the estimated noise level for the input video frame includes:
identifying a first portion of the input video frame, the first portion including a first plurality of pixels;
determining convolved values for the first portion, wherein each convolved value from the convolved values for the first portion corresponds to a respective pixel from the first plurality of pixels;
determining an averaged value by averaging the convolved values such that convolved values corresponding to pixels having pixel values outside a defined range are omitted from the averaging and convolved values corresponding to pixels having pixel values within the defined range are included in the averaging;
determining an estimated noise level for the first portion as a product of the averaged value, a defined constant multiplier, and a defined constant correction coefficient; and
obtaining the estimated noise level for the input video frame based on the estimated noise level for the first portion.

12. The apparatus of claim 11, wherein determining the estimated noise level for the input video frame includes:
identifying a second portion of the input video frame, the second portion partially overlapping the first portion;
determining an estimated noise level for the second portion; and
obtaining the estimated noise level for the input video frame based on the estimated noise level for the first portion and the estimated noise level for the second portion.

13. The apparatus of claim 12, wherein:
the first portion of the input frame is a 16×16 block of luminance pixels; and
the second portion of the input frame is a 16×16 block of luminance pixels.

14. The apparatus of claim 13, wherein:
the second portion of the input frame overlaps the first portion of the input frame by eight pixels horizontally;
the second portion of the input frame overlaps the first portion of the input frame by eight pixels vertically; or
the second portion of the input frame overlaps the first portion of the input frame by eight pixels horizontally and by eight pixels vertically.

15. The apparatus of claim 11, wherein determining the estimated noise level for the input video frame includes:
determining a plurality of estimated noise levels such that the plurality of estimated noise levels includes a respective estimated noise level for each portion from a plurality of partially overlapping portions from the input video frame that includes the first portion of the input video frame;
identifying an updated plurality of estimated noise levels by, for each estimated noise level from the plurality of estimated noise levels:

in response to a determination that a cardinality of pixels having pixel values within the defined range from the respective portion from the plurality of partially overlapping portions is less than a defined minimum threshold, omitting the estimated noise level from the updated plurality of estimated noise levels; and in response to a determination that the cardinality of pixels having pixel values within the defined range from the respective portion from the plurality of partially overlapping portions is at least the defined minimum threshold, including the estimated noise level in the updated plurality of estimated noise levels; and identifying the minimum estimated noise level from the updated plurality of estimated noise levels as the estimated noise level for the input video frame.

16. The apparatus of claim 10, wherein encoding the input frame includes:

determining a noise filter strength based on the estimated noise level for the input video frame;

generating an input noise filtered frame by noise filtering the input video frame in accordance with the noise filter strength;

wherein determining the quantization parameter value for encoding the input frame includes using the input noise filtered frame as the input frame; and wherein encoding the input frame includes using the input noise filtered frame as the input frame.

17. A method comprising:

generating, by a processor, an encoded frame by encoding an input video frame, wherein encoding the input frame includes:

determining an estimated noise level for the input video frame, wherein determining the estimated noise level for the input video frame includes:

determining a plurality of estimated noise levels such that the plurality of estimated noise levels includes a respective estimated noise level for each portion from a plurality of partially overlapping portions from the input video frame, wherein each portion from a plurality of partially overlapping portions includes a respective plurality of pixels, and wherein, for each portion from a plurality of partially overlapping portions, determining the respective estimated noise level includes:

determining convolved values for the portion, wherein each convolved value from the convolved values for the portion corresponds to a respective pixel from the respective plurality of pixels from the portion;

determining an averaged value by averaging the convolved values such that convolved values corresponding to pixels having pixel values outside a defined range are omitted from the determining the averaged value and convolved values corresponding to pixels having pixel values within the defined range are included in determining the averaged value;

in response to a determination that a cardinality of pixels from the portion having pixel values within the defined range is at least a defined minimum threshold:

determining an estimated noise level for the portion as a product of the averaged value, a defined constant multiplier, and a defined constant correction coefficient; and including the estimated noise level for the portion in the plurality of estimated noise levels; and in response to a determination that the cardinality of pixels from the portion having pixel values within the defined range is less than the defined minimum threshold, omitting an estimated noise level for the portion from the plurality of estimated noise levels; and identifying a minimum estimated noise level from the plurality of estimated noise levels as the estimated noise level for the input video frame;

obtaining the encoded frame by encoding the input video frame based on the minimum estimated noise level;

including the encoded frame in an output bitstream; and outputting the output bitstream.

18. The method of claim 17, wherein obtaining the encoded frame by encoding the input video frame based on the minimum estimated noise level includes:

determining a noise filter strength based on the estimated noise level for the input video frame;

generating an input noise filtered frame by noise filtering the input video frame in accordance with the noise filter strength; and obtaining the encoded frame by encoding the input noise filtered frame.

19. The method of claim 18, wherein obtaining the encoded frame by encoding the input video frame based on the minimum estimated noise level includes: determining a minimum quantization parameter level based on the minimum estimated noise level for the input video frame; determining a quantization parameter value for encoding the input noise filtered frame such that the quantization parameter value is at least the minimum quantization parameter level; and obtaining the encoded frame by encoding the input noise filtered frame in accordance with the quantization parameter value.

20. The method of claim 17, wherein a first partially overlapping portion from the plurality of partially overlapping portions overlaps a second partially overlapping portion from the plurality of partially overlapping portions such that:

on a condition that the first partially overlapping portion and the second partially overlapping portion are horizontally overlapping portions, the first partially overlapping portion overlaps the second partially overlapping portion horizontally by half the width of the partially overlapping portion;

on a condition that the first partially overlapping portion and the second partially overlapping portion are vertically overlapping portions, the first partially overlapping portion overlaps the second partially overlapping portion vertically by half the height of the partially overlapping portion;

on a condition that the first partially overlapping portion and the second partially overlapping portion are horizontally and vertically overlapping portions, the first partially overlapping portion overlaps the second partially overlapping portion diagonally by half the width of the partially overlapping portion and half the height of the partially overlapping portion.

21. The method of claim 1, wherein the estimated noise level is an estimate of noise in the input video frame.

* * * * *